TRACING STYLUS CIRCUIT FOR REPLICA PRODUCING SYSTEM

Filed March 9, 1966 2 Sheets-Sheet 1

United States Patent Office 3,467,899

Patented Sept. 16, 1969

3,467,899
TRACING STYLUS CIRCUIT FOR REPLICA PRODUCING SYSTEM

Seiuemon Inaba, Kawasaki-shi, Kanryo Shimizu, Neguro-ku, Tokiji Shimajiri, Mitaka-shi, Tokyo, and Norito Yoshitake, Kawasaki-shi, Japan, assignors to Fujitsu Limited, Kawasaki, Japan, a corporation of Japan Filed Mar. 9, 1966, Ser. No. 533,021
Claims priority, application Japan, Mar. 15, 1965, 40/15,156
Int. Cl. H02p *1/54, 5/46, 7/68*
U.S. Cl. 318—18 6 Claims

ABSTRACT OF THE DISCLOSURE

A tracing stylus circuit includes a pulse motor having a speed of rotation proportional to the repetition rate of pulses supplied to it and being coupled to a movable mounting for a tracing stylus. A voltage producing device coupled to the stylus continuously produces a voltage having a magnitude corresponding to the position of the stylus. A pulse generator connected to the voltage producing device produces a series of pulses having a repetition rate which varies with the magnitude of a voltage applied thereto. The output of the pulse generator is applied to the pulse motor so that the motor moves the stylus in a direction which nullifies its previous movement in accordance with the series of pulses applied thereto and having a repetition rate dependent upon the position of the stylus.

DESCRIPTION OF THE INVENTION

The present invention relates to a replica producing system. More particularly, the invention relates to a tracing stylus circuit for a replica producing system.

The principal object of the present invention is to provide a new and improved tracing stylus circuit for a replica producing system. The tracing stylus circuit of the present invention provides a tracing operation which does not overshoot or hunt and is not unstable. The tracing stylus circuit of the present invention provides stable, non-overshooting, non-hunting operation which is efficient, accurate and reliable in operation and which utilizes simple structure.

In accordance with the present invention, a tracing stylus circuit for a replica producing system comprises a tracing stylus and a mounting device movably mounting the stylus for movement in opposite directions. A moving apparatus coupled to the mounting device moves the stylus in opposite directions. A voltage producing device coupled to the stylus continuously produces a voltage having a magnitude corresponding to the position of the stylus. A pulse generator having an input and an output produces at the output a series of pulses having a repetition rate which varies with the magnitude of a voltage applied to the input. Connecting circuitry connects the input of the pulse generator to the voltage producing device and connects the output of the pulse generator to the moving apparatus whereby a series of pulses having a repetition rate depending upon the position of the stylus energizes the moving apparatus to move the stylus in a direction which nullifies its previous movement. The moving apparatus comprises a pulse motor having a speed of rotation proportional to the repetition rate of the pulses supplied to it and a direction of rotation depending upon the polarity of the pulses and driving means connected between the connecting means and the pulse motor for driving the pulse motor in accordance with the repetition rate and polarity of the pulses. The voltage producing device comprises a potentiometer having two end points and a midpoint between the end points, a slide contact coupled to the stylus and movable with the stylus between the end points, and a source of DC voltage connected across the end points. The midpoint is a neutral point of zero voltage and the voltage decreases from a maximum when the slide contact is at one end point to a minimum when the slide contact is at the other end point, and the polarity of the voltage changes at the midpoint. The connecting circuitry comprises a sign detector having inputs connected to the DC voltage source and the slide contact of the potentiometer and outputs connected to the input of the pulse generator for applying the voltage produced by the voltage producing apparatus to the pulse generator and for determining the polarity of such voltage. The connecting circuitry further comprises a gate having inputs connected to the outputs of the sign detector, inputs connected to the output of the pulse generator and outputs connected to the moving apparatus. The sign detector controls the operation of the gate and transfers the series of pulses produced by the pulse generator in accordance with the polarity of the voltage produced by the voltage producing device. The pulse generator comprises a first variable frequency pulse oscillator and a second variable frequency pulse oscillator.

In order that the present invention may be readily carried into effect, it will now be described with reference to the accompanying drawings, wherein.

Figure 1:
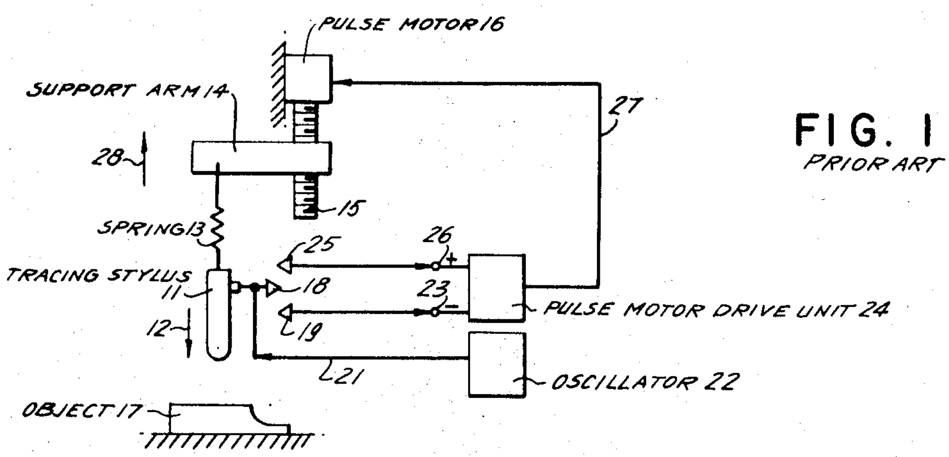
FIG. 1 is a schematic block diagram of an embodiment of a tracing stylus circuit of the prior art.

In the prior art tracing stylus circuit of FIG. 1, a tracing stylus 11 is urged in the direction of an arrow 12 by a spring 13 which is mounted on a movable support arm 14 at its upper end and is affixed to said stylus at its lower end. The support arm 14 is threadedly coupled to a threaded member 15 which is axially rotated by a fixedly mounted pulse motor 16. When the motor 16 rotates in one direction, it rotates the member 15 in the same direction and thereby moves the support arm 14 and the tracing stylus 11 in one of the direction of the arrow 12 and the opposite direction. When the motor 16 rotates in the opposite direction, it rotates the member 15 in the opposite direction and thereby moves the support arm 14 and the tracing stylus 11 in the opposite direction.

When the tracing stylus 11 is in the position shown, in which it is spaced from the object 17 which is to be reproduced, an electrical contact 18 supported by said stylus is in electrical contact with a first fixed electrical contact 19 due to the action of the spring 13 in urging said stylus in the direction of the arrow 12. The contact 18 is electrically connected via a lead 21 to an oscillator 22 which continuously produces a series of pulses. The first fixed electrical contact 19 is connected to the negative input terminal 23 of a pulse motor drive unit 24. A second fixed electrical contact 25, spaced from the first fixed electrical contact 19 and in operative proximity with the contact 18, is connected to the positive input terminal 26 of the pulse motor drive unit 24.

When the contact 18 is in electrical contact with the first fixed electrical contact 19, the oscillator 22 is connected to the negative input terminal 23 of the drive unit 24 and supplies the series of pulses produced by said oscillator to said drive unit. The drive unit 24 is connected to the pulse motor 16 via a lead 27 and causes said pulse motor to rotate in one direction when the pulses produced by the oscillator 22 are supplied to the negative input terminal 23 of said drive unit. The drive unit 24 causes the pulse motor 16 to rotate in the opposite direction when the pulses produced by the oscillator 22 are supplied to the positive input terminal 26 of said drive unit.

When the pulses produced by the oscillator 22 are supplied to the negative input terminal 23 of the drive unit 24, the pulse motor 16 and the threaded member 15 rotate in a direction in which the support arm 14 and the tracing stylus 11 move in the direction of an arrow 28. When the pulses produced by the oscillator 22 are supplied to the positive input terminal 26 of the drive unit 24, the pulse motor 16 and the threaded member 15 rotate in the opposite direction in which the support arm 14 and the tracing stylus 11 move in the direction of the arrow 12.

When the pulses produced by the oscillator 22 are supplied to the negative input terminal 23 of the drive unit 24, due to the action of the spring 13 in moving the tracing stylus 11 in the direction of the arrow 12 so that the contact 18 eventually abuts and makes electrical contact with the first fixed contact 19, said tracing stylus is moved in the direction of the arrow 28. The contact 18 eventually breaks electrical contact with the contact 19 and thereby opens the circuit of the oscillator 22 and the supply of pulses to the drive unit 24 ceases. The movement of the stylus 11 by the motor 16 then ceases.

When the pulses prdouced by the oscillator 22 are supplied to the positive input terminal 26 of the drive unit 24 and the tracing stylus 11 is moved in the direction of the arrow 12, said stylus may eventually abut the object 17 and the contact 18 is moved beyond the contact 25 in the direction of said arrow. When electrical contact between the contacts 18 and 25 is broken, by the separation of said contacts, the oscillator 22 circuit is opened and the supply to pulses of the drive unit 24 ceases. The movement of the stylus 11 by the motor 16 then ceases.

If the object 17 is of sufficient dimensions to prevent the contact 18 from contacting the contact 19 in the direction of the arrow 12, but instead urges the stylus 11 in the direction of the arrow 28 against the action of the spring 13, the contact 18 eventually abuts and makes electrical contact with the second fixed contact 25. When the contacts 18 and 25 are in electrical contact, the oscillator 22 is connected to the positive input terminal 26 of the drive unit 24 and the tracing stylus 11 is moved in the direction of the arrow 12.

It is thus seen that, although in ideal operation, the space between the contacts 19 and 25 should determine the precision or accuracy limits of the operation, this is not attainable because there is a delay between the electrical contact of the contact 18 with the contact 19 or the contact 25 and the movement of the stylus 11 via the arm 14, the member 15 and the motor 16. Thus, even if the stylus 11 is in abutment with the object 17 and the contact 18, after moving in the direction of the arrow 12, is out of electrical contact with the contact 25 so that no pulses are supplied to the pulse motor 16, said stylus continues to move in the direction of the arrow 12 until the expiration of a time equal to the time of delay in the movement of the motor 16, member 15 and arm 14. When the stylus 11 is spaced from the object 17 and the contact 18, after moving in the direction of the arrow 28, is out of electrical contact with the contact 19 so that no pulses are supplied to the pulse motor 16, said stylus continues to move in the direction of the arrow 28 until the expiration of a time equal to the time of delay in the movement of the motor 16, member 15 and arm 14. This creates overshoot or hunting in the stylus 11 and therefore makes the operation unstable. If the first and second fixed contacts 19 and 25 are spaced a sufficient distance from each other to avoid overshooting or if the frequency of the series of pulses of the oscillator 22 is decreased sufficiently to avoid overshooting, the accuracy and speed of operation are severely impaired.

In the prior art tracing stylus circuit of the type of FIG. 1, the pulses produced by the oscillator 22 are of constant frequency. The circuit functions to maintain the tracing stylus 11 in its neutral position, with its contact 18 midway between the first and second fixed contacts 19 and 25 in order to perform the tracing operation for the production of the replica of the object 17, but overshoots and hunts, so that tis operation is unstable, as mentioned.

Figure 2:
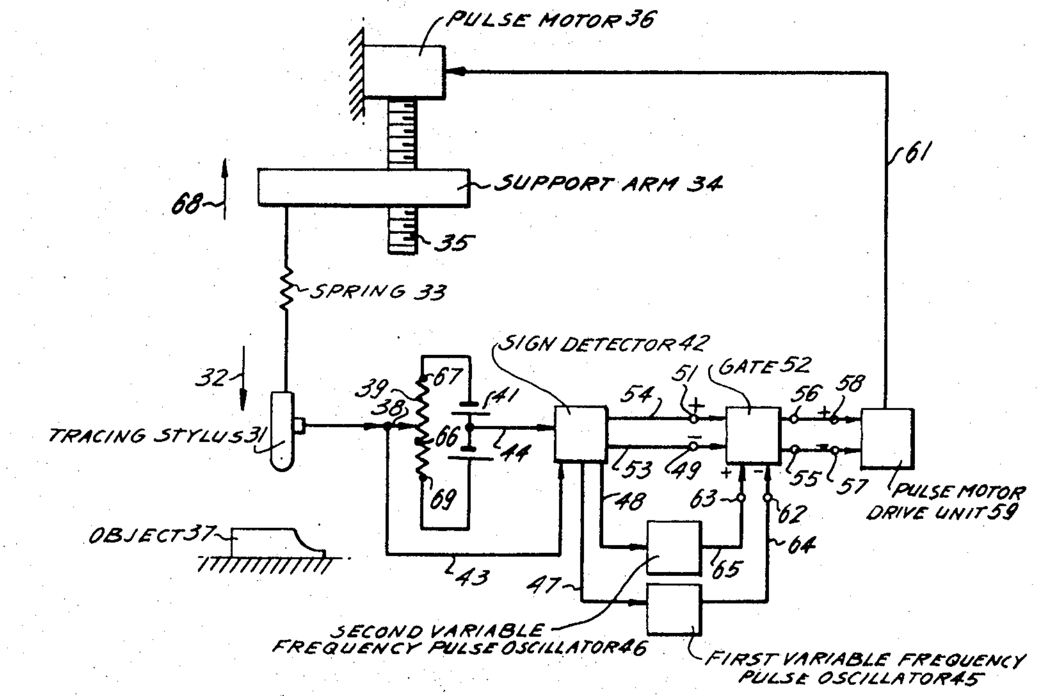
FIG. 2 is a schematic block diagram of an embodiment of a tracing stylus circuit of the present invention.

FIG. 2 illustrates the tracing stylus circuit of the present invention. In FIG. 2, a tracing stylus 31 is urged in the direction of an arrow 32 by a spring 33 which is mounted on a movable support arm 34 at its upper end and is affixed to said stylus at its lower end. The support arm 34 is threadedly coupled to a threaded member 35 which is axially rotated by a fixedly mounted pulse motor 36. The operation of the motor 36, the threaded member 35, the support arm 34, the spring 33 and the tracing stylus 31 and their interrelation are the same as those of the motor 16, the member 15, the arm 14, the spring 13 and the stylus 11 of FIG. 1. The stylus 31 is positioned in operative proximity with the object 37 of which a replica is to be made.

An electrical contact 38 is supported by the stylus 31 and functions as the slide contact of a potentiometer 39. A constant DC voltage is provided across the potentiometer 39 by a battery 41 or other suitable source of DC voltage which is connected across said potentiometer. Thus, the voltage between the slide contact 38 and either end of the potentiometer 39 is proportional to the position of said slide contact and is therefore proportional to the position of the stylus 31 which supports said slide contact.

The slide contact 38 is connected to a sign detector 42 via a lead 43 and the voltage source 41 is connected to said sign detector via a lead 44. The sign detector 42 is connected to the inputs of first and second variable frequency pulse oscillators 45 and 46 via leads 47 and 48, respectively, and to the input terminals 49 and 51 of a gate 52 via leads 53 and 54, respectively. The output terminals 55 and 56 of the gate 52 are connected to the negative and positive input terminals 57 and 58, respectively, of a pulse motor drive unit 59. The pulse motor drive unit 59 is connected to the pulse motor 36 via a lead 61 and controls the speed and direction of rotation of said pulse motor. The outputs of the oscillators 45 and 46 are connected to the input terminals 62 and 63 of the gate 52 via leads 64 and 65, respectively.

The sign detector 42 detects the sign or polarity of the potentiometer slide contact 38 voltage relative to a neutral point at its midpoint 66, and controls the operation of the gate 52 in accordance with such polarity. The sign detector 42 also transfers the potentiometer slide contact 30 voltage to the variable frequency pulse oscillators 45 and 46. Each variable frequency oscillator 45 and 46 functions to produce a series of pulses having a frequency which varies in proportion with the voltage of the slide contact 38 applied to it. The sign detector 42 thus makes either a positive path 63, 56 or a negative path 62, 55 through the gate 52 conductive under the control of the signals applied to its input terminals 51 and 49, respectively.

When the sign detector 42 produces a positive signal in the lead 54, such signal makes the gate 52 conductive in its positive path 63, 56 and the series of pulses produced by the second variable frequency pulse oscillator 46 are supplied to the positive input terminal 58 of the pulse motor drive unit 59. When the sign detector 42 produces a negative signal in the lead 53, such signal makes the gate 52 conductive in its negative path 62, 55 and the series of pulses produced by the first variable frequency pulse oscillator 45 are supplied to the negative input terminal 57 of the pulse motor drive unit 59. The drive unit 59 causes the pulse motor 36 to rotate in one direction when the pulses produced by the oscillator 46 are supplied to the positive input terminal 58 of said drive unit. The drive unit 59 causes the pulse motor 36 to rotate in the opposite direction when the pulses produced by the oscillator 45 are supplied to the negative input terminal 57 of said drive unit.

In FIG. 2, as in the prior art tracing stylus circuit of FIG. 1, the spring 33 urges the tracing stylus 31 in the direction of the arrow 32. The slide contact 38 of the potentiometer 39 moves with the stylus 31 and maintains continuous electrical contact with said potentiometer. The voltage provided by the slide contact 38 is zero when said slide contact is at the midpoint 66 of the potentiometer 39 and is positive from said midpoint to the end point 67 of said potentiometer in increasing positive magnitude as said slide contact moves from said midpoint to said end point in the direction of an arrow 68. The voltage provided by the slide contact 38 is negative from the midpoint 66 to the end point 69 of the potentiometer 39 in increasing negative magnitude as said slide contact moves from said midpoint to said end point in the direction of the arrow 32.

As the spring 33 urges the stylus 31 in the direction of the arrow 32, therefore, the voltage provided by the slide contact 38 decreases in magnitude and changes from a positive to a negative voltage at the midpoint 66. When the stylus 31 abuts the object 37 and is moved in the direction of the arrow 68, the voltage provided by the slide contact 38 increases in magnitude and changes from a negative to a positive voltage at the midpoint 66. The voltage provided by the slide contact 38 is gradual in variation.

Each of the first and second variable frequency pulse oscillators 45 and 46 produces a series of pulses having a frequency which is proportional to the absolute magnitude of the slide contact 38 voltage, so that when said slide contact is near the midpoint 66 the series of pulses produced by each of the oscillators is of very low frequency. Thus, the range or limits of the zero or neutral point of the sign detector 42 determines the precision of the replica production operation.

The pulse motor 36 comprises any suitable motor which rotates through an angle corresponding to the number of pulses supplied to the motor; the speed of rotation of the motor being proportional to the frequency of the supply pulses. A suitable motor for such use is an electrohydraulic pulse motor, which comprises a step motor and a hydraulic motor. Therefore, since the frequency of the pulse produced by the oscillators 45 and 46 is very low near the neutral point 66 of the potentiometer 39, corresponding to the zero point of the sign detector 42, the tracing operation is stable, without overshoot or hunting; the stylus 31 being rapidly and accurately positioned in the region of said neutral point without overshoot or hunting.

Figure 3:
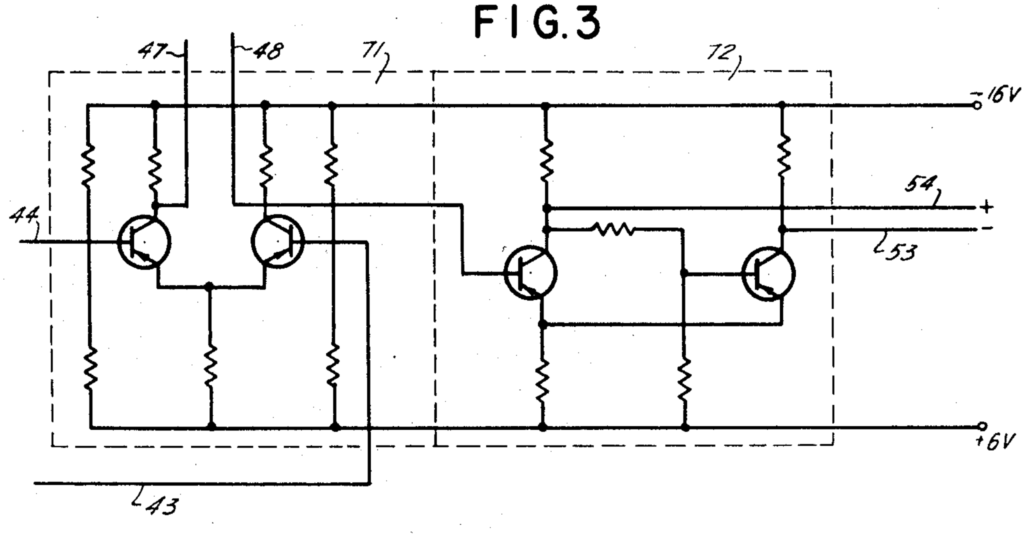
FIG. 3 is a circuit diagram of an embodiment of a sign detector which may be utilized in the embodiment of FIG. 2.
Figure 4:
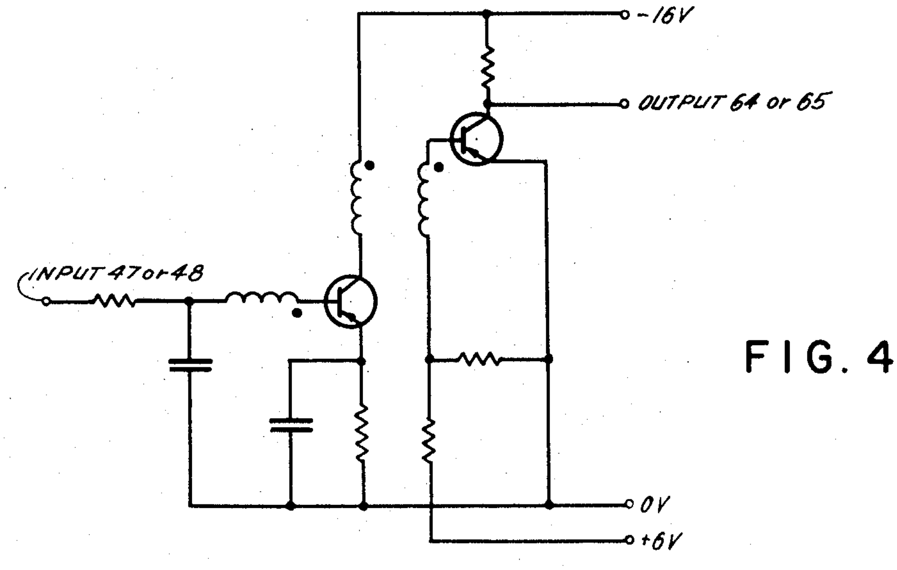
FIG. 4 is a circuit diagram of an embodiment of a variable frequency pulse oscillator which may be utilized in the embodiment of FIG. 2.
Figure 5:
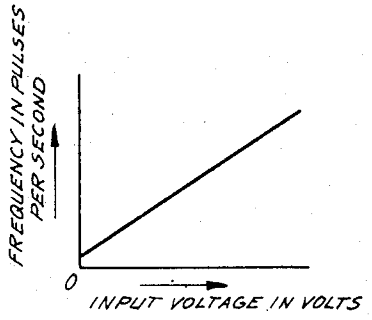
FIG. 5 is a graphical presentation of the input voltage versus frequency of the output pulses of the variable frequency pulse oscillator of FIG. 4.

The sign detector 42 may comprise any known suitable sign detector circuit such as, for example, that shown in FIG. 3. The sign detector circuit of FIG. 3 comprises a differential amplifier 71 and a Schmitt trigger circuit 72 connected to said differential amplifier. FIG. 4 illustrates a variable frequency pulse oscillator which may be utilized as the first variable frequency pulse oscillator 45 and which may be utilized as the second variable frequency pulse oscillator 46. The variable frequency pulse oscillator of FIG. 4 produces a pulse train having a frequency or repetition rate at its output which is proportional to the magnitude of the voltage applied to its input over a very wide range. The input voltage versus frequency of the variable frequency pulse oscillator of FIG. 4 is shown in FIG. 5, wherein the abscissa indicates the input voltage to the oscillator in volts and the ordinate indicates the frequency of the pulses produced at the output of the oscillator in pulses per second.

While the invention has been described by means of a specific example and in a specific embodiment, we do not wish to be limited thereto, for obvious modifications will occur to those skilled in the art without departing from the spirit and scope of the invention.

We claim:

1. A tracing stylus circuit, comprising
a tracing stylus;
mounting means movably mounting said stylus for movement in opposite directions;
moving means comprising a pulse motor having a speed of rotation proportional to the repetition rate of pulses supplied to it coupled to said mounting means for moving said stylus in opposite directions;
voltage producing means coupled to said stylus for continuously producing a voltage having a magnitude corresponding to the position of said stylus;
pulse means having an input and an output for producing at said output a series of pulses having a repetition rate which varies with the magnitude of a voltage applied to said input; and
connecting means connecting the input of said pulse means to said voltage producing means and connecting the output of said pulse means to said moving means whereby a series of pulses having a repitition rate dependent upon the position of said stylus energixes said moving means to move said stylus in a direction which nullifies its previous movement.

2. A tracing stylus circuit as claimed in claim 1, wherein said pulse motor has a direction of rotation dependent upon the polarity of the pulses applied to it and driving means connected between said connecting means and said pulse motor for driving said pulse motor in accordance with the repetition rate and polarity of said pulses.

3. A tracing stylus circuit as claimed in claim 1, wherein said voltage producing means comprises a potentiometer having two end points and a midpoint between said end points, a slide contact coupled to said stylus and movable with said stylus between said end points and a source of DC voltage connected across said end points, said midpoint being a neutral point of zero voltage and said voltage decreasing from a maximum when said slide contact is at one end point to a minimum when said slide contact is at the other end point with a polarity of said voltage changing at said midpoint.

4. A tracing stylus circuit as claimed in claim 3, wherein said connecting means comprises a sign detector means having inputs connected to said DC voltage source and the slide contact of said potentiometer and outputs connected to the input of said pulse means for applying the voltage produced by said voltage producing means to said pulse means and for determining the polarity of said voltage.

5. A tracing stylus circuit as claimed in claim 4, wherein said connecting means further comprises gate means having inputs connected to outputs of said sign detector means, inputs connected to the output of said pulse means and outputs connected to said moving means, said sign detector means controlling the operation of said gate means to transfer the series of pulses produced by said pulse means in accordance with the polarity of the voltage produced by said voltage producing means.

6. A tracing stylus circuit as claimed in claim 4, wherein said pulse means comprises a first variable frequency pulse oscillator and a second variable frequency pulse oscillator.

References Cited

UNITED STATES PATENTS

| | | |
|---|---|---|
| 2,766,414 | 10/1956 | Jessey et al. |
| 2,837,706 | 6/1958 | Glassey. |

| | | |
|---|---|---|
| 2,941,135 | 6/1960 | Anderson. |
| 2,983,858 | 5/1961 | Herndon. |
| 3,015,806 | 1/1962 | Wang et al. |
| 3,109,974 | 11/1963 | Hall Mark. |
| 3,156,856 | 11/1964 | Nance. |

ORIS L. RADER, Primary Examiner

G. R. SIMMONS, Assistant Examiner

U.S. Cl. X.R.

90—13.5, 62; 318—138